United States Patent

[11] 3,631,971

[72] Inventor Helfried O. Rinkleib Longmont, Colo.
[21] Appl. No. 33,996
[22] Filed May 4, 1970
[45] Patented Jan. 4, 1972
[73] Assignee International Business Machines Corporation Armonk, N.Y.

[54] SNAP-OPEN MAGNETIC TAPE CARTRIDGE

8 Claims, 3 Drawing Figs.

[52] U.S. Cl. .......... 206/52 R, 220/60, 312/37, 312/138
[51] Int. Cl. .......... B65d 43/10, B65d 85/67
[50] Field of Search .......... 206/52 F, 52 R, 1, 1.5, 42, 16 A; 220/60, 31, 31 S, 36, 43 P, 47; 229/44; 312/37, 138

[56] References Cited

UNITED STATES PATENTS

| | | | |
|---|---|---|---|
| 2,906,428 | 9/1959 | Fralick .......... | 220/31 |
| 2,984,401 | 5/1961 | Herkender .......... | 229/44 |

*Primary Examiner*—William T. Dixson, Jr.
*Attorneys*—Hanifin and Jancin and Herbert F. Somermeyer

ABSTRACT: An automatically openable tape cartridge having an integrally formed snap latch. One end of the tape within the cartridge is secured to the free end of a closable lid. Upon displacing a longitudinal wall of the cartridge adjacent the free end, camming action causes the lid to snap open pulling the tape out. Mating cam surfaces on the displaced longitudinal wall and the free end of the lid forces the lid open. On the end walls of the cartridge are two inwardly opening grooves or latch-receiving means. These receive latching scallops on the ends of the lid. The scallops ride over the cartridge end walls. The cartridge contains a spool having axially movable flanges for facilitating automatic handling of the cartridge and the contained magnetic tape.

INVENTOR
HELFRIED O. RINKLEIB

BY

ATTORNEY

SNAP-OPEN MAGNETIC TAPE CARTRIDGE

BACKGROUND OF THE INVENTION

This invention relates to magnetic tape cartridges and more particularly to a magnetic tape cartridge which is automatically assemblable and openable.

The use of magnetic tape storage systems within data processing systems is extremely wide. In fact, many of the magnetic tape storage systems require the use of many thousands of spools of tape. Such a large repertoire of magnetic tape records creates a handling problem in moving the tapes from storage compartments to tape handlers or processors. Many library configurations have been proposed for automatically accessing tape cartridges, transporting same to a processing station and automatically processing tape. Such automatic handling imposes severe constraints upon the tape cartridge, that is, it should be lightweight, strong and easily automatically opened and closed. Because of the large usage requirements within a given magnetic tape storage system, the cartridge should be extremely low cost. This means that the cartridge should be constructed such as to be easily and inexpensively fabricated. Additionally the tape within each cartridge should have a sufficient surface area for recording a large number of signals. Further, the cartridge should open in a manner to partially unspool tape to thereby facilitate automatic processing of the magnetic tape.

SUMMARY OF THE INVENTION

It is an object of the present invention to provide an improved low-cost automatically openable tape cartridge which is easily and inexpensively fabricated.

The above-stated and other objects of the invention are achieved in a molded plastic cartridge box or receptacle having a lid with an integral snap latch. In a preferred form, the cartridge consists of a rectangular box having an open face with a flat closable lid hinged along one longitudinal wall. The free end of the flat lid and the longitudinal wall opposite the hinged connection have mating cam surfaces. On the ends of the lid are a pair of outwardly extending scallops or latches which are respectively held in a pair of inwardly opening grooves formed in the end walls of the receptacle. The box lid snaps closed by the scallops or other detents riding over the end walls into the grooves. To open the lid the one longitudinal wall is pressed inwardly camming the lid outwardly. The end walls of the receptacle then flex outwardly thereby releasing scallops from the grooves. This action and the resiliency of the molded receptacle cause the lid to smartly snap outwardly. The scallop and groove location may be interchanged.

The tape within the receptacle has one end secured to the free end of the lid, such that as the lid snaps outwardly the tape is at least partially removed from the receptacle for facilitating automatic processing. In the illustrated form of the invention the tape is wound on a spool which is rotated in a bearingless manner within the tape receptacle. The spool is so constructed as to be easily fabricated from a minimum number of parts and secures the other end of the tape. Alternatively, the tape could be stored in receptacle as a series of convolutions with the tape being releasably secured to the free end of the lid for removing same from the receptacle as the lid snaps outwardly.

The foregoing and other objects, features, and advantages of the invention will be apparent from the following more particular description of preferred embodiments of the invention, as illustrated in the accompanying drawings.

DETAILED DESCRIPTION

Figures 1, 2, 3:
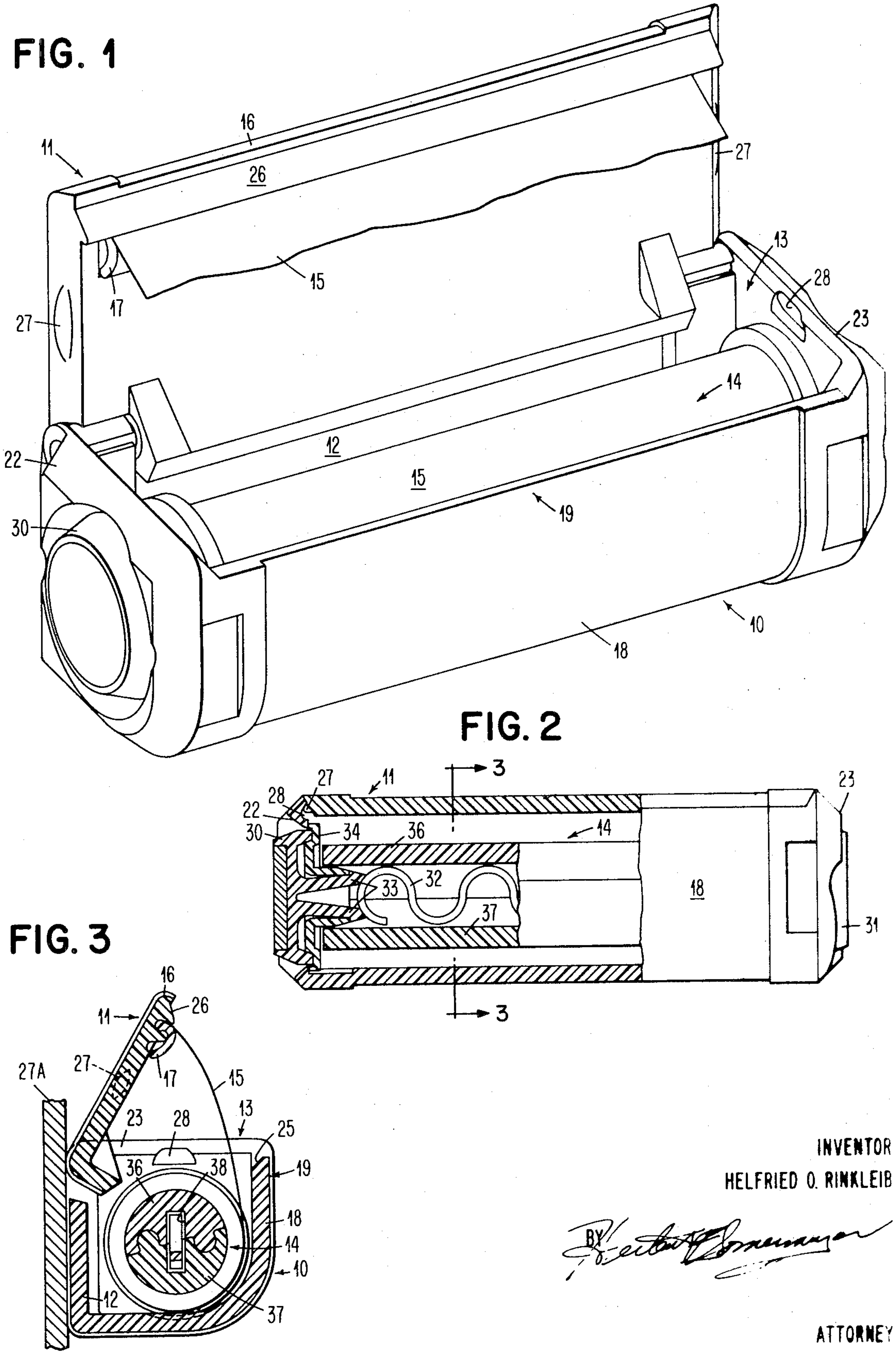
FIG. 1 is an enlarged perspective illustration of a cartridge constructed in accordance with the teachings of the present invention.
FIG. 2 is an enlarged side elevational view of the FIG. 1 cartridge having a portion cut away for illustrating the internal operating parts.
FIG. 3 is an enlarged view taken in the directions of the arrows along line 3—3 of FIG. 2. This figure further illustrates the constructional details of the spool and the carriage.

Referring now more particularly to the drawing, like numerals indicate like parts and constructional features in the three views. Generally rectangular tape receptacle or box 10 has longitudinal side 13 open. Lid 11 is hinged to longitudinal wall 12 adjacent open side 13. Spool 14 disposed in receptacle 10 for rotational movement supports magnetic tape 15. One end of tape 15 is secured to free end 16 of lid 11 by tension clamp 17. To close the lid, spool 14 is rotated with the web pulling the lid securely into latching engagement with receptacle 10. To open the box, front longitudinal wall 18 is pressed inwardly at 19. Such action urges lid 11 upwardly as seen in FIG. 3. Scallops 27, 28 force end walls 22 and 23 to flex outwardly a small amount to permit lid 11 to snap outwardly for partially unspooling tape 15 from freely rotatable spool 14.

Tension clamp 17 is in the shape of a comma. Tape 15 is firmly secured to the lid in that the tail end of clamp 17 is pressed against tape 15 (FIG. 3). If tape 15 tends to move out of clamp 17, further tension is created thereby clamping tape 15 more tightly.

The integral snap latch has two important aspects for snap-opening operation. The first is a set of mating cam surfaces 25 and 26, respectively, on the front longitudinal wall 18 and the free end 16 of lid 11. As front longitudinal wall 18 is depressed at 19, the camming action forces lid 11 to pivot outwardly. In the second aspect, snap opening is caused by the latch-catch arrangement at each end of the cartridge. The latch portion consists of a pair of outwardly extending scallops or latches 27 and 28, respectively, formed on the inwardly tapered end walls of flat lid 11. Both end walls of receptacle 10 have an inwardly opening catch groove 28 for receiving scallops 27 to releasably hold lid 11 in a closed position. The latches extend outwardly longitudinally of and lie along the width of lid 11.

When opening or closing a cartridge, scallops 27 ride over the upper ends of end walls 22 and 23. In this regard each outer periphery of the receptacle end walls has a reduced thickness for permitting outward flexure of the end walls. While scallops 27, 28 are shown in their preferred form of arcuate cross section, no limitation thereto is intended. Such scallops could be extended along the edge of lid 11, that is, each scallop could approach the width of lid 11. Also, grooves 28 could extend across the end walls. It is preferred that the illustrated configurations be used. It is also preferred that scallops 27, 28 extend to the outermost end extent of lid 11. In some instances, scallops could extend slightly beyond the ends of lid 11, respectively. With arcuate scallops, frictional locking engagement is increased as the scallops enter further into grooves 28.

The operation of the latch-catch during opening is caused by camming lid 11 outwardly with the resultant force being transmitted through scallops 27 to outwardly flex end walls 22 and 23. It has been found that opening is facilitated when the rear longitudinal wall 12 is held firmly against flat surface 27A. Flat surface 27A prevents distortion of cartridge walls 12 and lid 11. The stresses introduced into the cartridge by depressing wall 18 are transferred throughout the cartridge. Surface 27A controls the effect of such stresses. This arrangement appears to maximize the effect of camming action on lid 11.

Spool assembly 14 is designed for use as a bearingless spool, that is, a mechanism (not shown) including a frustoconical clutch engages and holds the outer spool flanges 30 and 31. Axial pressure is applied causing the flanges to move inwardly overcoming the resilient urging of spring 32. The holding mechanism is mounted for free rotation such that when lid 11 snaps outwardly, magnetic tape 15 is free to unspool a short distance, as previously explained.

Outer flanges 30 and 31 include bifurcated portions 33 which extend through an aperture in end walls 22 and 23, respectively. The outer end portions of each bifurcated portion 33 lockingly engage over inner flange 34. The outer peripheries of flanges 34 engage the inner peripheral portions of the receptacle end wall thereby holding the spool within receptacle 10. During rotational motion the axially inward urging frees the inner flanges 34.

The hub of spool 14 consists of two identical parts 36 and 37 which are lockingly engaged together as best seen in FIG. 3. Spring 32 is disposed in axially extending recess 38 within the spool hub. Web 15 has one end extending between the halves 36 and 37 and is secured to the hub by the locking engagement. In FIG. 2 please note the axial spacing between the end of the hub 36, 37 and inner flange 34 which permits inward axial movement of assemblies 30, 34 and 31, 34.

When using a snap-in type of hinge, the entire cartridge, including tape 13, is assembled merely by snapping the parts together. Such a design facilitates automatic fabrication, the details of which are not necessary to successfully practice this invention.

While the invention has been particularly shown and described with reference to preferred embodiments thereof, it will be understood by those skilled in the art that various changes in form and details may be made therein without departing from the spirit and scope of the invention.

What is claimed is:

1. A closable cartridge having a hollow base member with an opening and having first and second end walls, first and second sidewalls; a closable lid hinged to said first sidewall for opening and closing movements between a free side of said lid and said second sidewall, said lid having first and second lid ends, respectively, closable on said first and second end walls;

the improvement including in combination:

an inwardly facing cam surface on said second sidewall adjacent said opening and a mating outwardly facing cam surface on said free side;

an outwardly extending latch on each lid end;

each end wall having an inwardly opening catch means for respectively receiving and releasably holding said latches; and said second sidewall being inwardly deformable to cam said lid outwardly and said end walls releasing said latches by outward deformation when said lid is cammed outwardly such that the lid snaps outwardly.

2. The subject matter of claim 1 wherein said lid ends include an inwardly tapered end portion, said latches being respectively integral on said portions as outwardly extending scallops with an axis parallel to the longitudinal extent of said lid.

3. The subject matter of claim 2 further including a magnetic tape removably disposed in said base member and having one end fixedly secured to said free end such that as said lid is opened said tape is at least partially removed from said base member by said scallops effecting a snap-opening action in a coaction with said end walls.

4. The subject matter of claim 2 wherein said lid is a platelike plastic member having a depending flange at said sidewall to facilitate hinging therebetween, said base member being a unitary plastic open-sided receptacle with all walls being flexible transverse to their respective extents, said scallops extending outwardly to approximately the outermost end extent of said lid.

5. The subject matter of claim 4 further including means holding said first sidewall against deformation during opening of said cartridge by inward deformation of said second sidewall, thereby facilitating snap-opening thereof.

6. A snap-opening magnetic-tape container assembly, a rectangular tape receptacle having longitudinal and end walls and with one side open and said walls capable of limited flexing, a closable lid hingedly secured to one longitudinal wall of the receptacle for closing the opening and having a set of end walls for closing onto end walls of said receptacle, the improvement including in combination, outwardly extending latch means on each one of a first set of said end walls, each end wall in a second set of said end walls having latch-receiving means for receiving said latch means, respectively for releasably holding said lid closed against said receptacle, said latch and latch-receiving means having a locking engagement as said latch means enters said latch-receiving means to thereby securely close the lid, means interacting between said lid and another longitudinal wall opposite said hinged securing to simultaneously flex said one wall inwardly of said receptacle and urge said lid to snap open by forcing said latches out of said latch-receiving means, respectively.

7. The assembly of claim 6 wherein said latches have a general arcuate shape for variable frictional locking engagement with the respective latch-receiving means.

8. The assembly of claim 6 further including means in operative relation to said one longitudinal wall for preventing said limited flexing such that stresses introduced by flexure of said another longitudinal wall to cam said lid outwardly are prevented from flexing said one longitudinal wall, such that said lid is not distorted to thereby facilitate snap opening.

* * * * *